Nov. 26, 1935. E. S. CORNELL, JR 2,022,028
COMBINED BRACKET AND GUARD
Filed Oct. 19, 1933 2 Sheets-Sheet 1

INVENTOR
Edward S. Cornell, Jr.
BY
HIS ATTORNEY

Nov. 26, 1935.                 E. S. CORNELL, JR                 2,022,028
                          COMBINED BRACKET AND GUARD
                          Filed Oct. 19, 1933           2 Sheets-Sheet 2

INVENTOR
Edward S. Cornell, Jr.
BY
HIS ATTORNEY

Patented Nov. 26, 1935

2,022,028

UNITED STATES PATENT OFFICE 2,022,028

COMBINED BRACKET AND GUARD

Edward S. Cornell, Jr., Larchmont, N. Y.

Application October 19, 1933, Serial No. 694,235

4 Claims. (Cl. 230—275)

My present invention relates generally to improvements in fans, and more particularly to a combined motor holding bracket and fan guard.

A feature of my invention is the provision of simple stamped parts to constitute the holding bracket.

A further feature of my invention is an improved fan guard adapted for association with a fan, motor casing, and motor casing holding bracket.

Another feature of my invention is an improved connecting means between the motor holding bracket and its supporting means, whereby universal adjustability is attained.

A further feature of my invention resides in the assembly of the adjustable motor holding means and the fan guard.

Other features and advantages of my construction will appear as the description of the invention progresses.

In the accompanying drawings.

Figure 1:
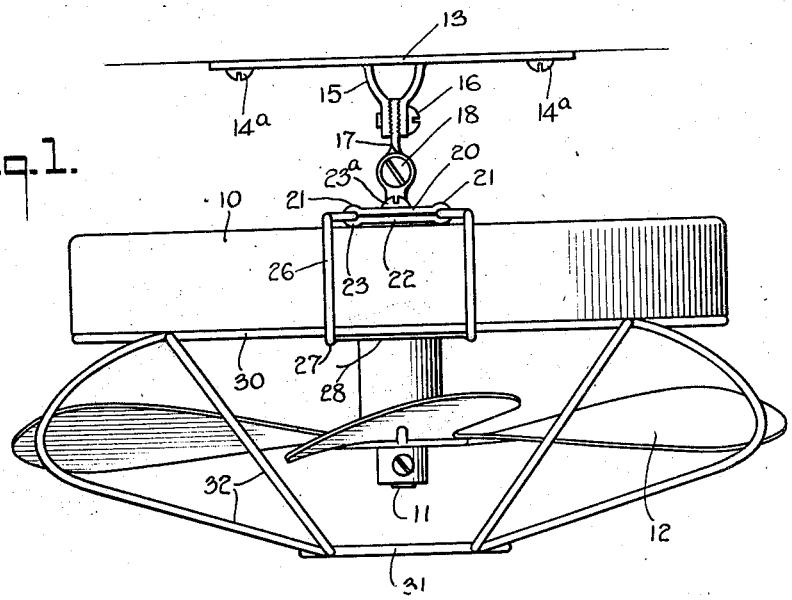
Fig. 1 is a front elevation showing my invention mounted on a motor casing and encircling the fan driven thereby.

Referring to the drawings, 10 designates a motor casing, cylindrical in form, and with the ends closed. Extending axially outward from one end is a shaft 11, carrying a multi-bladed fan 12. The particular type of motor shown is an atmospheric, or sub-atmospheric pressure motor, but such showing is for illustrative purposes only, as obviously any desired type of motor is applicable for use with my present invention.

Figure 3:
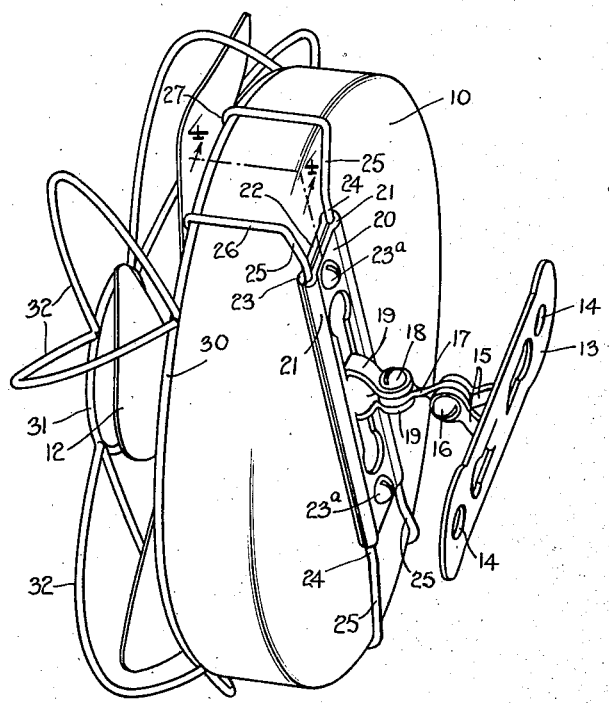
Fig. 3 is a perspective view, taken from the rear, and illustrating the complete assembly of my improved device and a motor casing.
Figure 4:
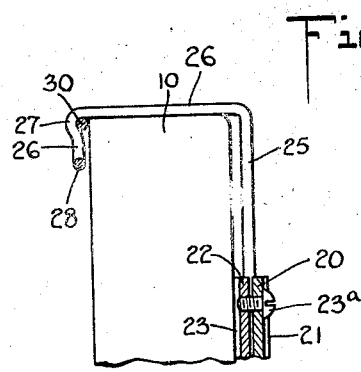
Fig. 4 is a detail sectional elevation on the line 4—4 of Fig. 3.

For holding the motor casing 10, and positioning the same as may be desired, I have provided an improved efficient bracket—see Fig. 3—wherein a base 13 of sheet metal of proper thickness and of any desired shape and area, is provided with perforations 14 adjacent to each end thereof, and through which may pass appropriate fastening devices, such as screws 14a, see Fig 1, for securing the bracket to a wall, or other support. Struck up out of the metal of the base 13, and symmetrically arranged with respect thereto, are the ears or lugs 15, perforated at their ends to receive a screw, or other form of pivot shaft 16 and on which is pivotally mounted one end of a link 17. The freedom of rotary movement of the link 17 with respect to the screw or shaft 16 may be adjusted, as is obvious. The link 17 is also and preferably formed of a metal stamping of sheet metal, and the end remote from the connection thereof with the screw or shaft 16 lies in a plane at right angles to such connection. This remote end of the link is also perforated to allow the same to be pivotally mounted on a screw or shaft 18 located in spaced ears or lugs 19. These ears or lugs 19 are formed integral with a plate 20 of appropriate width, thickness and length, and preferably of metal. Such plate 20 is also provided with perforations adjacent each end thereof, and has formed adjacent each longitudinal edge the grooves 21. Cooperatively associated with the plate 20 is a plate 22, similar in size and shape thereto and having formed on its longitudinal edges the grooves 23 which are in alignment with the grooves 21 in the plate 20. The grooves 21 and 23, in the plates 20 and 22 respectively, are arranged in pairs, as shown in Fig. 3, and act as a clamping means, as will be hereinafter described. The plate 22 is provided adjacent to its ends, with tapped holes in alignment with the perforations adjacent the ends of the plate 20. Such perforations in the ends of the plate 20 are clearance perforations to allow the free passage of the body of the round head screws 23a, which screwing into the threaded holes in the plate 22, permit the adjustable association of the plates 20 and 22, and make a clamping device of these elements.

Slidably mounted in the pairs of grooves 21, 23 is a resilient motor holding clamp composed of resilient material such as spring tempered wire and comprising an endless form consisting of a pair of parallelly arranged members 24 having at each end thereof outwardly extending members 25 merging into members 26 extending at right angles thereto so as to rest substantially on the cylindrical portion of the motor casing 10. Extending at right angles to the members 26 so as to lie substantially against one face of the motor casing 10 are jaws 27, these jaws being connected by a spacing bar 28. Formed in the jaws 27 are the notches 28a adapted to partially encircle the material of the fan guard—to be hereinafter described. The member 27 lies substantially parallel to the members 25 and the distance between such jaws 27 and 25 is slightly less than the length of the cylindrical motor casing 10, so that when the outwardly extending members 25 and jaws 27 are in position on such casing 10, they will yieldingly clip such casing. It is understood, of course, that the parallelly arranged members 24 have their parts 25, 26, 27 and 28 arranged at each end thereof, as shown in Fig. 3. Also, while the resilient clamp just referred to has been described as being endless and formed of spring material, it will be obvious that the clamp may be formed in two parts, substantially an upper part and a lower part, as viewed in Fig. 3, and each part independently movable with respect to the other. I prefer, however, to have the spring clamp just described formed endless, and, the parallelly arranged members thereof being mounted in the pairs of grooves 21 and 23, it is obvious that I may position the plates 20 and 22 at any point along the length of the members 24, and when in the desired adjusted position, the screws 23a may be utilized to hold the various elements in their adjusted position. With the base 13 screwed onto a support, such as a wall, and with the pivot screws or shafts 16 and 18 at right angles to each other, and each pivot shaft adjustable, and with the spring clamp above described movable longitudinally with respect to the plates 20 and 22, it is obvious that I am able to adjust the spring clamp and therefore the motor casing 10 universally with respect to the base 13.

Figure 2:
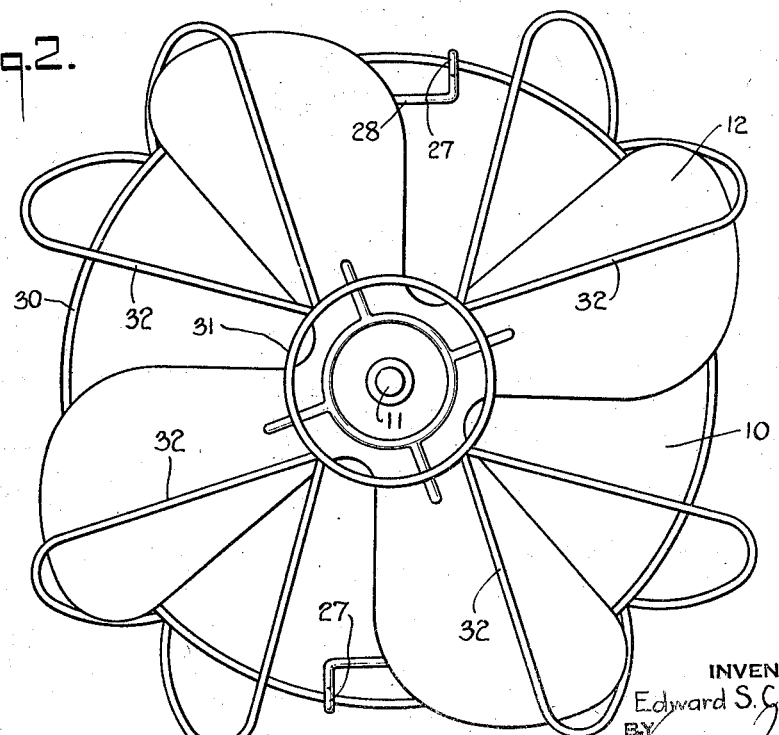
Fig. 2 is a plan view of Fig. 1.

Referring now particularly to Figs. 2 and 3, 30 designates a ring-like base for a fan guard, preferably of wire and of a diameter slightly less than the diameter of the motor casing 10. Concentrically arranged with respect to the ring-like base 30 is a ring 31, also preferably of wire, and which ring lies in a plane parallel to but spaced apart from the plane in which lies the ring-like base 30. Secured to the ring-like base 30 and ring 31 are the ends of a plurality of members 32, also preferably of wire and curved to form a guard for the multi-bladed fan 12 on the shaft 11 of the motor. Such guard formed of the wires 32 and the ring-like base 30 and ring 31 allows free rotation of the fan 12 and permits the maximum amount of air to be sent through the guard while yet affording ample protection to persons in the vicinity of the device.

Assuming the ring-like base 30, with the ring 31 and guard wires 32 mounted thereon, to be placed on the front face of the motor casing 10, as shown in Figs. 2 and 3, the spring clamp, above described and specifically illustrated in Fig. 3, is slipped into the position shown in Fig. 1 with the notches 28 in the members jaws 27 partially encircling the ring-like base 30. The fan guard is thus readily held in position with respect to the motor casing 10 and to the multi-bladed fan 12.

After assembly as just described, and assuming the base 13 to have been attached to a suitable support such as a wall, the operator by proper manipulation of the screws or shafts 16 and 18 and the screws 23a may position the motor casing 10 in any position to obtain the proper direction of current of air from the multi-bladed fan 12.

While I have shown and described a specific embodiment of my invention, I am not to be limited to the exact details as shown and described, and may vary the size, shape and arrangement of parts comprising the structure within relatively wide limits without departing from the spirit of the invention.

I claim,

1. In a combined bracket and fan guard, the combination of a fan guard including a ring-like base adapted to engage with a face of a motor casing, of a clamp adapted to be mounted on the motor casing and having a jaw lying parallel to the face of the motor casing, said jaw being provided with a groove partially encircling the material of the ring-like base and clamping the ring-like base onto the face of the motor casing.

2. In a combined bracket and fan guard, the combination of a fan guard including a ring-like base adapted to engage with a face of a motor casing, of a clamp adapted to be mounted on the motor casing and having a jaw lying parallel to the face of the motor casing, said jaw being provided with a plurality of spaced grooves, each partially encircling the material of the ring-like base, and clamping the ring-like base onto the face of the motor casing.

3. In a combined bracket and guard the combination of a bracket, a clamp adapted to be mounted on a motor casing secured to said bracket, said clamp having a jaw lying parallel to the face of the motor casing on the side remote from the bracket, a fan guard, including a ring-like base adapted to engage with a face of the motor casing, and a clamping groove in said clamp jaw partially encircling the material of the ring-like base and clamping the ring-like base onto the face of the motor casing.

4. In a combined bracket and guard the combination of a clamp adapted to be mounted on a motor casing and extending diametrically of one face of the casing a bracket adjustably mounted on the diametrically extending clamp, and movable along such clamp, clamping jaws arranged at each end of the diametrically extending clamp and lying parallel to the face of the motor casing on the side remote from the bracket, a fan guard, including a ring-like base adapted to engage with a face of the motor casing, and a clamping groove in each clamping jaw partially encircling the material of the ring-like base and clamping the ring-like base onto the face of the motor casing.

EDWARD S. CORNELL, Jr.